(12) United States Patent
Noh et al.

(10) Patent No.: US 9,231,687 B2
(45) Date of Patent: Jan. 5, 2016

(54) COMMUNICATION APPARATUS AND COMMUNICATION SYSTEM INCLUDING THE SAME, AND DUAL POLARIZATION SIGNAL TRANSMITTING AND RECEIVING METHOD OF COMMUNICATION SYSTEM

(71) Applicant: ELECTRONICS AND TELECOMMUNICATIONS RESEARCH INSTITUTE, Daejeon (KR)

(72) Inventors: Go San Noh, Hwaseong-si (KR); Seung Jae Bahng, Daejeon (KR); Jun Woo Kim, Daejeon (KR); Youn Ok Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/612,840

(22) Filed: Feb. 3, 2015

(65) Prior Publication Data

US 2015/0229384 A1 Aug. 13, 2015

(30) Foreign Application Priority Data

Feb. 10, 2014 (KR) ........................ 10-2014-0014596

(51) Int. Cl.
*H04B 7/02* (2006.01)
*H04B 7/10* (2006.01)
*H04L 1/20* (2006.01)
*H04L 1/00* (2006.01)

(52) U.S. Cl.
CPC ................ *H04B 7/10* (2013.01); *H04L 1/0034* (2013.01); *H04L 1/20* (2013.01)

(58) Field of Classification Search
CPC ........ H04B 7/002; H04B 7/0408; H04B 7/10; H04L 1/0034; H04L 1/20; H01Q 21/24; G01S 7/024; G01S 7/025; G01R 29/0892
See application file for complete search history.

(56) References Cited

U.S. PATENT DOCUMENTS

| 4,027,105 | A | * | 5/1977 | Kannowade | ........... | H04B 7/002 333/21 A |
| 5,495,502 | A | * | 2/1996 | Andersen | ............... | H04B 7/002 375/235 |
| 7,181,245 | B2 | | 2/2007 | Smith et al. | | |
| 2004/0104843 | A1 | * | 6/2004 | Mimura | ............. | G01R 29/0892 342/362 |
| 2007/0222661 | A1 | * | 9/2007 | Stagliano, Jr. | .......... | G01S 7/025 342/26 R |
| 2008/0318533 | A1 | * | 12/2008 | Rofougaran | ............. | H04B 7/10 455/73 |

* cited by examiner

*Primary Examiner* — David B. Lugo
(74) *Attorney, Agent, or Firm* — Rabin & Berdo, P.C.

(57) ABSTRACT

Disclosed is a communication system including a first communication apparatus and a second communication apparatus that communicate with each other through a dual polarization antenna, the system including: a first communication apparatus which calculates a co-polar ratio defined by a ratio of a first channel gain for a first polarization and a second channel gain for a second polarization; and a second communication apparatus which calculates a first rotation angle for the first polarization and a second rotation angle for the second polarization, respectively, by using the co-polar ratio transferred from the first communication apparatus, and transmits to the first communication apparatus a first rotational polarization generated by rotating the first polarization at the first rotation angle and a second rotational polarization generated by rotating the second polarization at the second rotation angle.

16 Claims, 4 Drawing Sheets

COMMUNICATION APPARATUS AND COMMUNICATION SYSTEM INCLUDING THE SAME, AND DUAL POLARIZATION SIGNAL TRANSMITTING AND RECEIVING METHOD OF COMMUNICATION SYSTEM

CROSS-REFERENCE TO RELATED APPLICATIONS

This application claims priority to and the benefit of Korean Patent Application No. 10-2014-0014596 filed in the Korean Intellectual Property Office on Feb. 10, 2014, the entire contents of which are incorporated herein by reference.

TECHNICAL FIELD

The present invention relates to a communication apparatus and a communication system including the same, and a dual polarization signal transmitting and receiving method of the communication system.

BACKGROUND ART

Resources such as a frequency, a time, a space, and electromagnetic polarization are known as resources for wireless communication and desired information may be transferred through wireless communication by using the resources. In particular, when information is transmitted by using dual polarization through a dual polarization antenna, double information may be theoretically transmitted.

In general, the dual polarization antenna is implemented in a form of an orthogonal dual polarization antenna so that two polarization antennas form angles at 90 degrees to each other. The reason is that two different signals may be transmitted without interference by using orthogonality between two polarization antennas.

However, in a transmission scheme using the orthogonal dual polarization antenna, when a channel gain of a vertical wave which is an orthogonal component and a channel gain of a horizontal wave are different from each other, a difference in signal-to-noise ratio between both orthogonal components is increased. Accordingly, when a signal is detected by a receiver, an error is concentrated in any one component, and as a result, overall error performance deteriorates.

SUMMARY OF THE INVENTION

The present invention has been made in an effort to provide a communication apparatus that can improve error performance in transmitting and receiving a dual polarization signal, a communication system including the same, and a dual polarization signal transmitting and receiving method of the communication system.

Technical objects of the present invention are not limited to the aforementioned technical objects and other technical objects which are not mentioned will be apparently appreciated by those skilled in the art from the following description.

An exemplary embodiment of the present invention provides a communication system including a first communication apparatus and a second communication apparatus that communicate with each other through a dual polarization antenna, the system including: a first communication apparatus which calculates a co-polar ratio defined by a ratio of a first channel gain for a first polarization and a second channel gain for a second polarization; and a second communication apparatus which calculates a first rotation angle for the first polarization and a second rotation angle for the second polarization, respectively, by using the co-polar ratio transferred from the first communication apparatus, and transmits to the first communication apparatus a first rotational polarization generated by rotating the first polarization at the first rotation angle and a second rotational polarization generated by rotating the second polarization at the second rotation angle.

The first rotation angle and the second rotation angle may be different from each other.

The first rotation angle and the second rotation angle may be determined by considering bit error rates (BERs) of the first rotational polarization and the second rotational polarization received by the first communication apparatus.

The first rotation angle and the second rotation angle may be determined so that signal-to-noise ratios (SNRs) of the first rotational polarization and the second rotational polarization received by the first communication apparatus are the same as each other.

The first rotation angle may be defined by [Equation 2] described below.

$$\alpha = \tan^{-1} \sqrt{\frac{1}{CPR}} \quad \text{[Equation 2]}$$

Herein, $\alpha$ represents the first rotation angle and CPR represents the co-polar ratio.

The second rotation angle may be defined by [Equation 3] described below.

$$\beta = \frac{\pi}{2} - \tan^{-1} \sqrt{\frac{1}{CPR}} \quad \text{[Equation 3]}$$

Herein, $\beta$ represents the second rotation angle and CPR represents the co-polar ratio.

The second communication apparatus may rotate the first polarization and the second polarization in the same direction.

The first communication apparatus may detect a signal by inversely rotating the first rotational polarization, which is received from the second communication apparatus, at the first rotation angle and inversely rotating the second rotational polarization, which is received from the second communication apparatus, at the second rotation angle.

The first communication apparatus may recalculate the co-polar ratio whenever characteristics of channels formed for communication with the second communication apparatus are changed.

The first polarization may be a horizontal wave and the second polarization may be a vertical wave.

Another exemplary embodiment of the present invention provides a dual polarization signal transmitting and receiving method of a communication system including a first communication apparatus and a second communication apparatus that communicate with each other through a dual polarization antenna, the method including: calculating, by the first communication apparatus, a co-polar ratio which is a ratio of a first channel gain for a first polarization and a second channel gain for a second polarization; transmitting, by the first communication apparatus, the co-polar ratio to the second communication apparatus; calculating, by the second communication apparatus, a first rotation angle for the first polarization and a second rotation angle for the second polarization by using the co-polar ratio; transmitting, by the second communication apparatus, to the first communication apparatus a first rotational polarization generated by rotating the first polarization at the first rotation angle and a second rotational polarization generated by rotating the second polarization at the second rotation angle; and detecting, by the first communication apparatus, a signal by inversely rotating the first rotational polarization at the first rotation angle and inversely rotating the second rotational polarization at the second rotation angle.

Yet another exemplary embodiment of the present invention provides a communication apparatus that communicates with another communication apparatus by using a dual polarization antenna, the apparatus including: a transmitting/receiving unit which receives from the another communication apparatus a co-polar ratio which is a ratio of a first channel gain for a first polarization and a second channel gain for a second polarization; a rotation angle calculating unit which calculates a first rotation angle for the first polarization and a second rotation angle for the second polarization by using the co-polar ratio; and a signal processing unit which generates a first rotational polarization by rotating the first polarization at the first rotation angle and generates a second rotational polarization by rotating the second polarization at the second rotation angle.

The transmitting/receiving unit may transmit the first rotational polarization and the second rotational polarization to another communication apparatus.

According to exemplary embodiments of the present invention, a communication apparatus, a communication system including the same, and a dual polarization signal transmitting and receiving method of the communication system can improve error performance in transmitting and receiving a dual polarization signal.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Herein, some exemplary embodiments will be described in detail with reference to the exemplary drawings. When reference numerals refer to components of each drawing, it is to be noted that although the same components are illustrated in different drawings, the same components are referred to by the same reference numerals as possible. In describing the embodiments of the present invention, when it is determined that the detailed description of the known configuration or function related to the present invention may interrupt understanding the exemplary embodiments of the present invention, the detailed description thereof will be omitted.

In describing constituent elements of the exemplary embodiment of the present invention, terms such as first, second, A, B, (a), and (b) may be used. The terms are only used to distinguish a constituent element from another constituent element, but nature or an order of the constituent element is not limited by the terms. Unless otherwise defined, all terms used herein including technological or scientific terms have the same meaning as those generally understood by a person with ordinary skill in the art to which the present invention pertains. Terms which are defined in a generally used dictionary should be interpreted to have the same meaning as the meaning in the context of the related art, and are not interpreted as an ideally or excessively formal meaning unless clearly defined in the present invention.

The present invention relates to a communication apparatus, a communication system including the same, and a dual polarization signal transmitting and receiving method of the communication system. In the specification, polarization represents a polarity direction of an electric field for a progress direction of an electromagnetic wave.

Figure 1:
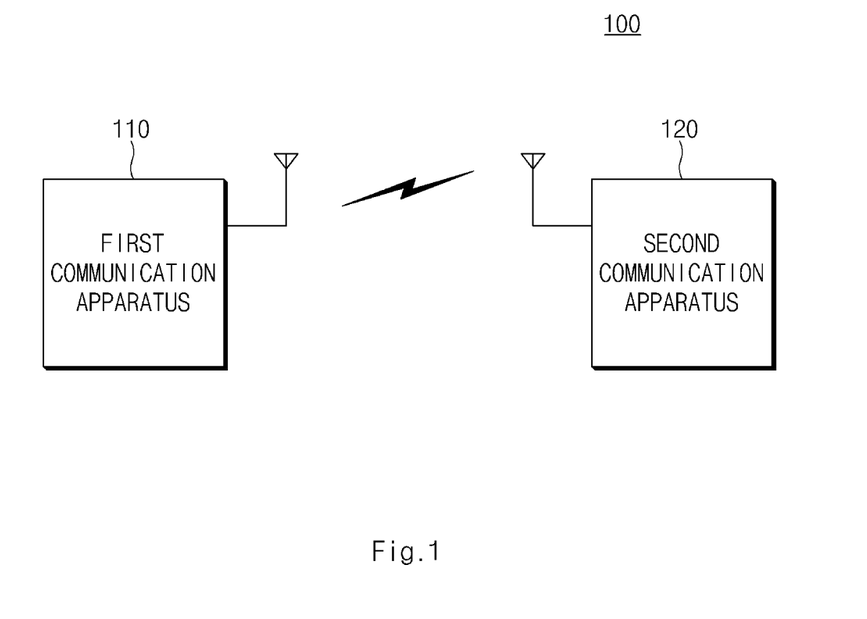
FIG. 1 illustrates a communication system according to an exemplary embodiment of the present invention.

FIG. 1 illustrates a communication system according to an exemplary embodiment of the present invention.

Referring to FIG. 1, a communication system 100 according to the exemplary embodiment of the present invention may include a first communication apparatus 110 and a second communication apparatus 120.

Each of the first communication apparatus 110 and the second communication apparatus 120 may include at least one transmitting/receiving dual polarization antenna. That is, the first communication apparatus 110 and the second communication apparatus 120 may communicate with each other through the dual polarization antenna. Herein, the dual polarization antenna may mean an antenna that may generate and receive various types of polarizations by controlling magnitudes and phases of the signal sent to vertical and horizontal antennas.

That is, when a transmitter uses the dual polarization antenna constituted by the vertical and horizontal antennas, the transmitter may generate various types of polarizations by controlling the magnitudes and the phases of the signals sent to the vertical and horizontal antennas. On the contrary, a receiver may receive various types of polarizations by differentiating a weight in the signals received by the vertical and horizontal antennas by using the dual polarization antenna. Consequently, the transmitter and the receiver may control transmission and reception polarizations by using the dual polarization antenna.

The first communication apparatus 110 and the second communication apparatus 120 may be a terminal of a smart phone, a repeater, or a base station and include apparatuses that perform various types of communications (e.g., wireless mobile communication and device-to-device communication).

The first communication apparatus 110 may communicate with the second communication apparatus 120 by using the dual polarization antenna. For example, the first communication apparatus 110 may form a first channel for transmitting and receiving a first polarization (e.g., a horizontal wave) and a second channel for transmitting and receiving a second polarization (e.g., a vertical wave) with the second communication apparatus 120. A channel gain (hereinafter, referred to as the 'first channel gain') of the first channel and a channel gain (hereinafter, referred to as the 'second channel gain') of the second channel may be different from each other.

The first communication apparatus 110 may calculate a co-polar ratio (CPR) defined by a ratio of the first channel gain and the second channel gain. For example, the first communication apparatus 110 may recalculate the co-polar ratio (CPR) whenever characteristics of the first channel and the second channel are changed and transmit the calculated CPR to the second communication apparatus 120.

The co-polar ratio (CPR) may be defined as represented in Equation 1 below.

$$CPR = \frac{|m_{vv}|^2}{|m_{hh}|^2} \qquad \text{[Equation 1]}$$

Herein, $m_{hh}$ may represent the first channel gain and $m_{vv}$ may represent the second channel gain.

The first communication apparatus 110 may transmit the calculated co-polar ratio (CPR) to the second communication apparatus 120. For example, a process in which the first communication apparatus 110 calculates the co-polar ratio (CPR) and transmits the calculated co-polar ratio (CPR) to the second communication apparatus 120 may be appreciated as a prior task for the first communication apparatus 110 to communicate with the second communication apparatus 120.

The second communication apparatus 120 may communicate with the first communication apparatus 120 by using the dual polarization antenna. The second communication apparatus 120 may calculate a first rotation angle α for the first polarization and a second rotation angle β for the second polarization by using the co-polar ratio (CPR) received from the first communication apparatus 110.

That is, the second communication apparatus 120 may calculate the first rotation angle α and the second rotation angle β in order to, in advance, compensate for a signal to noise ratio (SNR) of the first polarization and the second polarization caused by a difference between the first channel gain and the second channel gain by using the co-polar ratio (CPR). In an aspect, the first rotation angle α and the second rotation angle β may be determined so that the SNRs of the first polarization and the second polarization received by the first communication apparatus 110 are the same as each other when the first polarization and the second polarization are transmitted from the second communication apparatus 120 to the first communication apparatus 110 through the first channel and the second channel, respectively.

The first rotation angle α and the second rotation angle β may be determined by considering bit error rates (BERs) of the first polarization and the second polarization received by the first communication apparatus 110, and for example, determined so that the BER is minimized.

Meanwhile, the first rotation angle α and the second rotation angle β may have different values from each other.

The first rotation angle α may be defined as represented in Equation 2 below.

$$\alpha = \tan^{-1}\sqrt{\frac{1}{CPR}} \qquad \text{[Equation 2]}$$

The second rotation angle β may be defined as represented in Equation 3 below.

$$\beta = \frac{\pi}{2} - \tan^{-1}\sqrt{\frac{1}{CPR}} \qquad \text{[Equation 3]}$$

The second communication apparatus 120 may rotate the first polarization at the first rotation angle α and rotates the second polarization at the second rotation angle β to transmit the rotated first and second polarizations. For example, the second communication apparatus 120 may rotate the first polarization and the second polarization in the same direction to transmit the rotated first and second polarizations to the first communication apparatus 110. Thereafter, the first communication apparatus 110 that receives the rotated first and second polarizations may inversely rotate the first and second polarizations at the first rotation angle α and the second rotation angle β, respectively, to detect a signal.

As described above, the second communication apparatus 120 of the communication system 100 according to the exemplary embodiment of the present invention calculates the rotation angles for the first polarization and the second polarization, respectively, by using the co-polar ratio (CPR) transferred from the first communication apparatus 110, and rotates the first polarization and the second polarization at the calculated first rotation angle α and second rotation angle β, respectively, to transmit the rotated first and second polarizations to the first communication apparatus 110. Accordingly, since the first polarization transmitted through the first channel and the second polarization transmitted through the second channel undergo the same channel gain, a difference in transmission error between the first channel and the second channel is decreased, thereby improving error performance.

Figure 2:
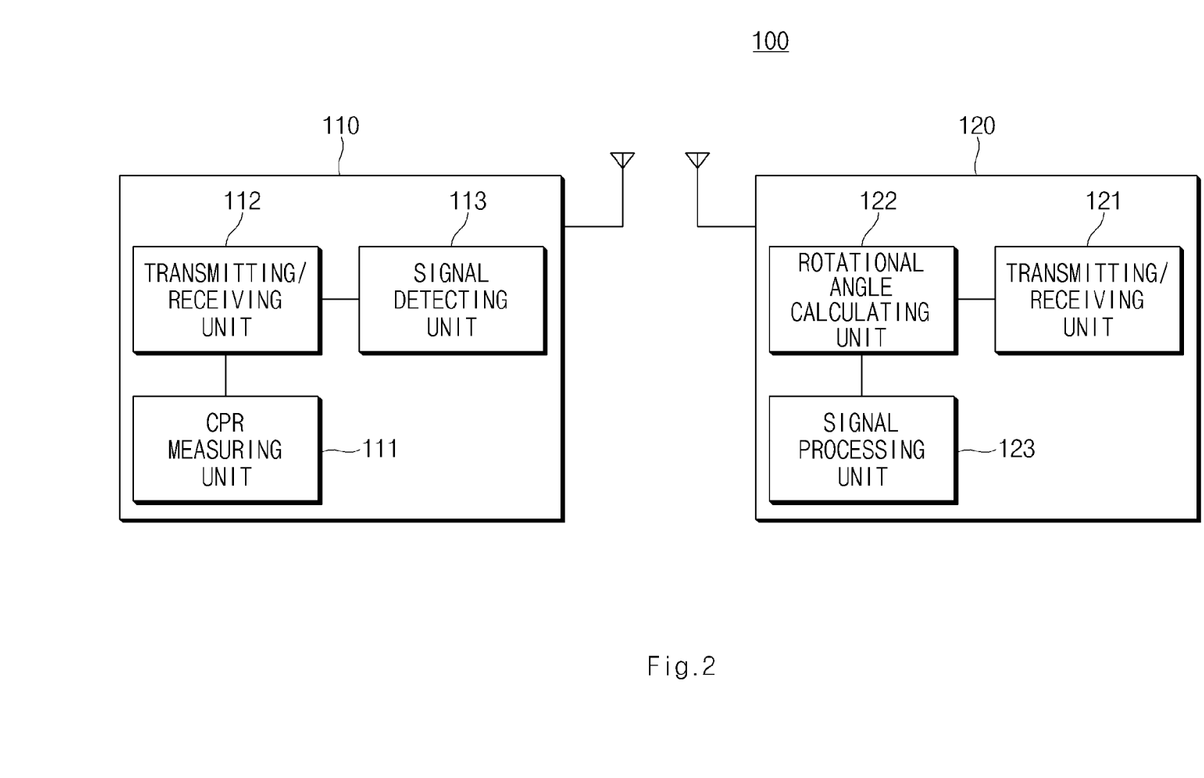
FIG. 2 is a block diagram specifically illustrating a first communication apparatus and a second communication apparatus of the communication system according to the exemplary embodiment of the present invention.
Figure 3:
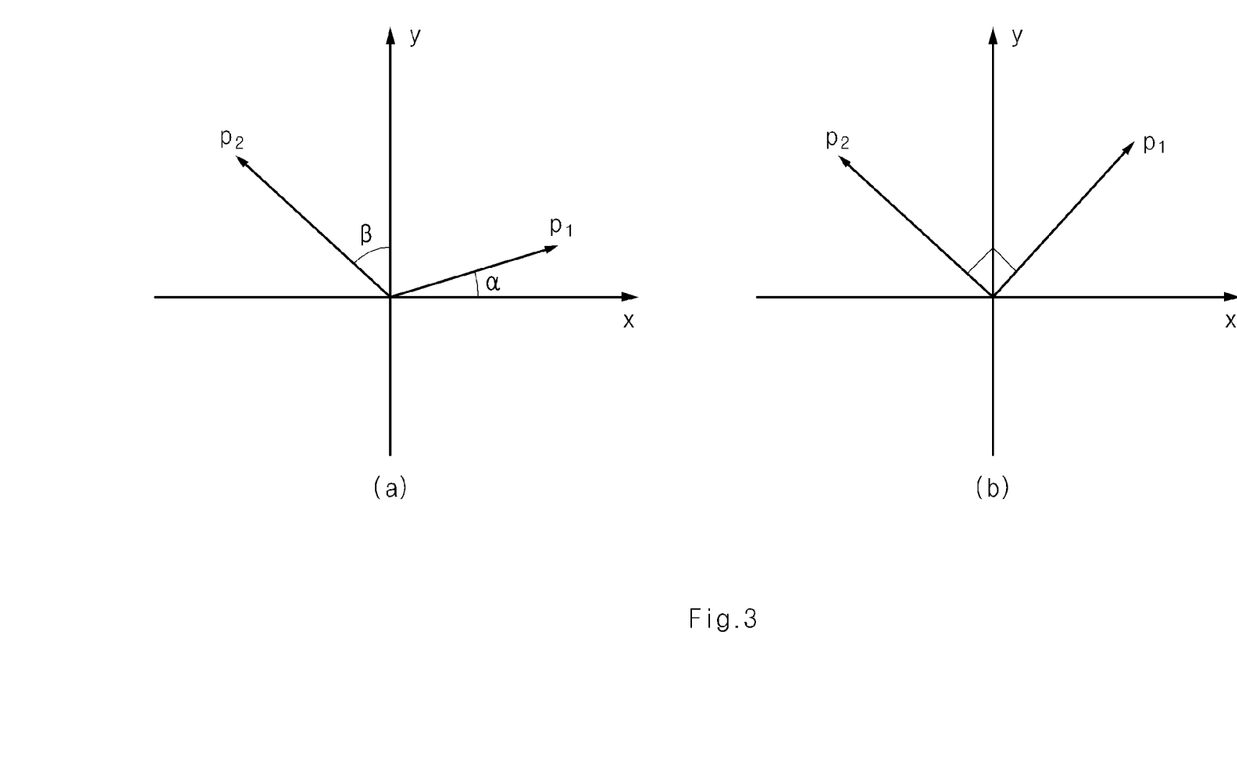
FIG. 3 is a graph for describing operations of the first communication apparatus and the second communication apparatus of the communication system according to the exemplary embodiment of the present invention.

FIG. 2 is a block diagram specifically illustrating a first communication apparatus and a second communication apparatus of the communication system according to the exemplary embodiment of the present invention. FIG. 3 is a graph for describing operations of the first communication apparatus and the second communication apparatus of the communication system according to the exemplary embodiment of the present invention.

In FIGS. 2 and 3, the first polarization may mean the horizontal wave and the second polarization may mean the vertical wave.

First, referring to FIG. 2, the first communication apparatus 110 may include a CPR measuring unit 111, a transmitting/receiving unit 111, and a signal detecting unit 113.

The CPR measuring unit 111 may measure/calculate the co-polar ratio (CPR). The CPR measuring unit 111 may calculate the co-polar ratio (CPR) through Equation 1 described above. The CPR measuring unit 111 may recalculate the co-polar ratio (CPR) whenever the characteristics of the first channel and the second channel are changed.

The transmitting/receiving unit 112 may communicate with the second communication apparatus 120 through the first and second channels. The transmitting/receiving unit 112 may transfer to the second communication apparatus 120 the co-polar ratio (CPR) generated by the CPR measuring unit 111 and receive a first rotational polarization p1 and a second rotational polarization p2 received from the second communication apparatus 120.

Referring to FIG. 2 and FIG. 3B, the signal detecting unit 113 may detect a signal by inversely rotating the first rotational polarization p1 and the second rotational polarization p2 received from the second communication apparatus 120 to be orthogonal. The signal may include, for example, information which the second communication apparatus 120 intends to transmit.

Referring to FIGS. 2 and 3A, the second communication apparatus 120 may include a transmitting/receiving unit 121, a rotation angle calculating unit 122, and a signal processing unit 123.

The transmitting/receiving unit 121 may communicate with the first communication apparatus 110 through the first and second channels. The transmitting/receiving unit 121 may receive the co-polar ratio (CPR) from the first communication apparatus 110 and transmit the first rotational polarization p1 and the second rotational polarization p2 to the first communication apparatus 110.

The rotation angle calculating unit 122 may calculate the first rotation angle α for the first polarization and the second rotation angle β for the second polarization by using the co-polar ratio (CPR). In detail, the rotation angle calculating unit 122 may calculate the first rotation angle α defined by Equation 2 described above and the second rotation angle β defined by Equation 3 described above.

The signal processing unit 123 may generate the first rotational polarization p1 by rotating the first polarization at the first rotation angle α and generate the second rotational polarization p2 by rotating the second polarization at the second rotation angle α. For example, the signal processing unit 123 may rotate the first polarization and the second polarization counterclockwise, but is not limited thereto. The generated first rotational polarization p1 and second rotational polarization p2 are to be transmitted to the first communication apparatus 110 through the transmitting/receiving unit 121.

Figure 4:
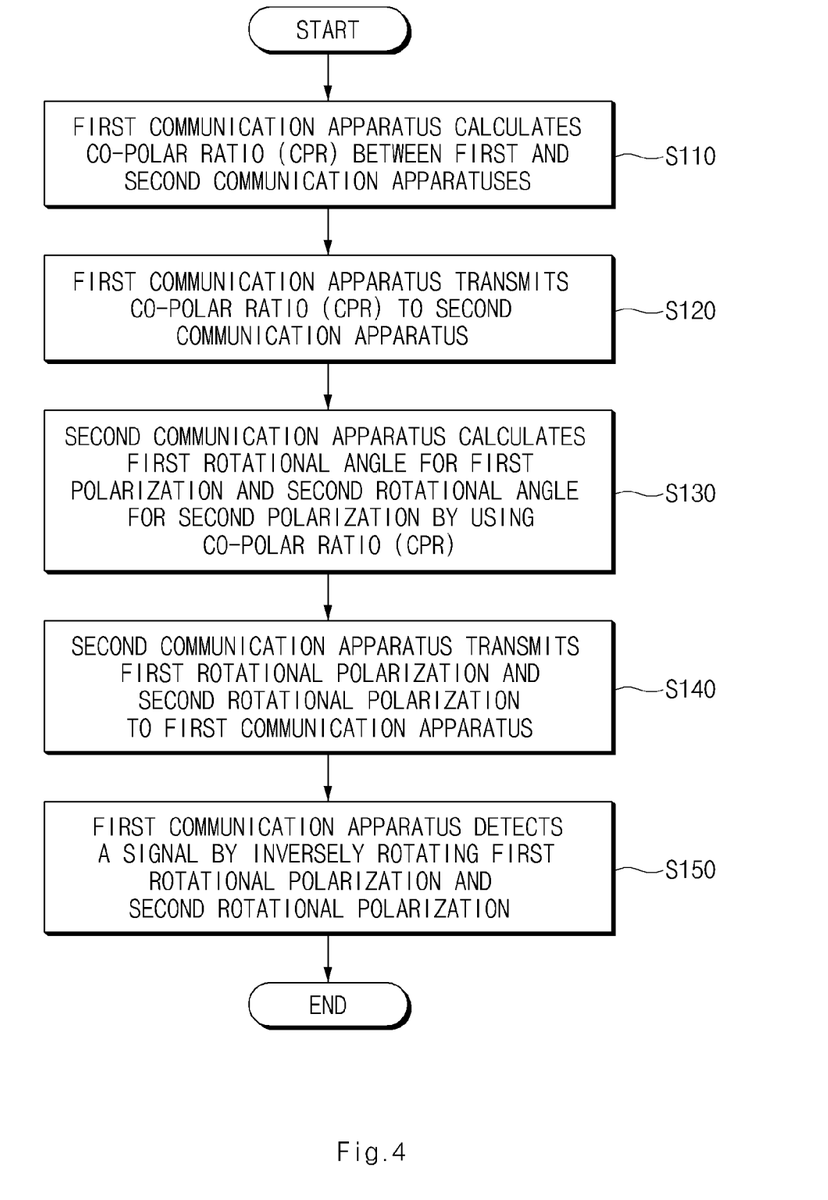
FIG. 4 is a flowchart illustrating a dual polarization signal transmitting and receiving method of a communication system according to an exemplary embodiment of the present invention.

FIG. 4 is a flowchart illustrating a dual polarization signal transmitting and receiving method of a communication system according to an exemplary embodiment of the present invention.

Referring to FIG. 4, the dual polarization signal transmitting and receiving method of a communication system according to the exemplary embodiment of the present invention may include calculating, by a first communication apparatus, a co-polar ratio (CPR) between the first communication apparatus and a second communication apparatus (S110), transmitting, by the first communication apparatus, the co-polar ratio (CPR) to the second communication apparatus (S120), calculating, by the second communication apparatus, a first rotation angle for a first polarization and a second rotation angle for a second polarization by using the co-polar ratio (CPR) (S130), transmitting, by the second communication apparatus, a first rotational polarization and a second rotational polarization to the first communication apparatus (S140), and detecting, by the first communication apparatus, a signal by inversely rotating the first rotational polarization and the second rotational polarization (S150).

Hereinafter, steps S110 to S150 will be described in detail with reference to FIG. 1.

First, in step S110, the first communication apparatus 110 may calculate the co-polar ratio (CPR) defined by a ratio of a first channel gain of a first channel for transmitting and receiving a first polarization (e.g., a horizontal wave) and a second channel gain of a second channel for transmitting and receiving a second polarization (e.g., a vertical wave) to and from the second communication apparatus 120. The first communication apparatus 110 may calculate the co-polar ratio (CPR) according to Equation 1 described above. The first communication apparatus 110 may recalculate the co-polar ratio (CPR) whenever characteristics of the first channel and the second channel are changed.

In step S120, the first communication apparatus 110 may transfer the calculated co-polar ratio (CPR) to the second communication apparatus 120.

In step S130, the second communication apparatus 120 may calculate the first rotation angle α for the first polarization and the second rotation angle β for the second polarization by using the co-polar ratio (CPR) transferred from the first communication apparatus 110. The second communication apparatus 120 may calculate the first rotation angle α and the second rotation angle β according to Equations 2 and 3 described above, respectively. This is to, in advance, compensate for distortions of the first polarization and the second polarization caused by a difference between the first channel gain and the second channel gain by using the co-polar ratio (CPR).

In step S140, the second communication apparatus 120 may generate the first rotational polarization by rotating the first polarization at the first rotation angle α and generate the second rotational polarization by rotating the second polarization at the second rotation angle β. The second communication apparatus 120 may transmit the generated first rotational polarization and second rotational polarization to the first communication apparatus 110.

In step S150, the first communication apparatus 110 may detect a signal by inversely rotating the first rotational polarization and the second rotational polarization received from the second communication apparatus 120.

As described above, in the dual polarization signal transmitting and receiving method of the communication system according to the exemplary embodiment of the present invention, the second communication apparatus 120 calculates the rotation angles for the first polarization and the second polarization, respectively, by using the co-polar ratio (CPR) transferred from the first communication apparatus 110, and rotates the first polarization and the second polarization at the calculated first rotation angle α and second rotation angle β, respectively, to transmit the rotated first and second polarizations to the first communication apparatus 110. Accordingly, since the first polarization transmitted through the first channel and the second polarization transmitted through the second channel undergo the same channel gain, a difference in transmission error between the first channel and the second channel is decreased, thereby improving error performance.

Steps of a method or an algorithm described in association with the exemplary embodiments disclosed in the specification may be directly implemented by hardware, a software module or a combination thereof, which is executed by a processor. The software module may reside in a RAM, a flash memory, a ROM, an EPROM, an EEPROM, a register, a hard disk, an attachable disk, a CD-ROM, or another predetermined type storage medium which is known in the art. An exemplary storage medium may be coupled to a processor, and the processor may read information from the storage medium and write information in the storage medium. As another method, the storage medium may be a type which is integrated with the processor. The processor and the storage medium may reside in an application specific integrated circuit (ASIC). The ASIC may reside in a user terminal. As another method, the processor and the storage medium may reside in the user terminal as individual components.

Various exemplary embodiments of the present invention have been just exemplarily described, and various changes and modifications may be made by those skilled in the art to which the present invention pertains without departing from the scope and spirit of the present invention. Accordingly, the exemplary embodiments disclosed herein are not intended to limit the technical spirit of the present invention but the scope of the technical spirit of the present invention is limited to the exemplary embodiments. The scope of the present invention may be interpreted by the appended claims and all the technical spirits in the equivalent range thereto are intended to be embraced by the claims of the present invention.

What is claimed is:

1. A communication system including a first communication apparatus and a second communication apparatus that communicate with each other through a dual polarization antenna, the system comprising:
   a first communication apparatus which calculates a co-polar ratio defined by a ratio of a first channel gain for a first polarization and a second channel gain for a second polarization; and
   a second communication apparatus which calculates a first rotation angle for the first polarization and a second rotation angle for the second polarization, respectively, by using the co-polar ratio transferred from the first communication apparatus, and transmits to the first communication apparatus a first rotational polarization generated by rotating the first polarization at the first rotation angle and a second rotational polarization generated by rotating the second polarization at the second rotation angle.

2. The system of claim 1, wherein the first rotation angle and the second rotation angle are different from each other.

3. The system of claim 1, wherein the first rotation angle and the second rotation angle are determined by considering bit error rates (BERs) of the first rotational polarization and the second rotational polarization received by the first communication apparatus.

4. The system of claim 1, wherein the first rotation angle and the second rotation angle are determined so that signal-to-noise ratios (SNRs) of the first rotational polarization and the second rotational polarization received by the first communication apparatus are the same as each other.

5. The system of claim 1, wherein the first rotation angle is defined by [Equation 2] described below:

$$\alpha = \tan^{-1}\sqrt{\frac{1}{CPR}} \qquad \text{[Equation 2]}$$

where $\alpha$ represents the first rotation angle and CPR represents the co-polar ratio.

6. The system of claim 5, wherein the second rotation angle is defined by [Equation 3] described below:

$$\beta = \frac{\pi}{2} - \tan^{-1}\sqrt{\frac{1}{CPR}} \qquad \text{[Equation 3]}$$

where $\beta$ represents the second rotation angle and CPR represents the co-polar ratio.

7. The system of claim 1, wherein the second communication apparatus rotates the first polarization and the second polarization in the same direction.

8. The system of claim 1, wherein the first communication apparatus detects a signal by inversely rotating the first rotational polarization, which is received from the second communication apparatus, at the first rotation angle and inversely rotating the second rotational polarization, which is received from the second communication apparatus, at the second rotation angle.

9. The system of claim 1, wherein the first communication apparatus recalculates the co-polar ratio whenever characteristics of channels formed for communication with the second communication apparatus are changed.

10. The system of claim 1, wherein the first polarization is a horizontal wave and the second polarization is a vertical wave.

11. A dual polarization signal transmitting and receiving method of a communication system including a first communication apparatus and a second communication apparatus that communicate with each other through a dual polarization antenna, the method comprising:
   calculating, by the first communication apparatus, a co-polar ratio which is a ratio of a first channel gain for a first polarization and a second channel gain for a second polarization;
   transmitting, by the first communication apparatus, the co-polar ratio to the second communication apparatus;
   calculating, by the second communication apparatus, a first rotation angle for the first polarization and a second rotation angle for the second polarization by using the co-polar ratio;
   transmitting, by the second communication apparatus, to the first communication apparatus a first rotational polarization generated by rotating the first polarization at the first rotation angle and a second rotational polarization generated by rotating the second polarization at the second rotation angle; and
   detecting, by the first communication apparatus, a signal by inversely rotating the first rotational polarization at the first rotation angle and inversely rotating the second rotational polarization at the second rotation angle.

12. A communication apparatus that communicates with another communication apparatus by using a dual polarization antenna, the apparatus comprising:
   a transmitting/receiving unit which receives from the another communication apparatus a co-polar ratio which is a ratio of a first channel gain for a first polarization and a second channel gain for a second polarization;
   a rotation angle calculating unit which calculates a first rotation angle for the first polarization and a second rotation angle for the second polarization by using the co-polar ratio; and
   a signal processing unit which generates a first rotational polarization by rotating the first polarization at the first rotation angle and generates a second rotational polarization by rotating the second polarization at the second rotation angle.

13. The apparatus of claim 12, wherein the transmitting/receiving unit transmits the first rotational polarization and the second rotational polarization to the another communication apparatus.

14. The apparatus of claim 12, wherein the first polarization is a horizontal wave and the second polarization is a vertical wave.

15. The apparatus of claim 14, wherein the first rotation angle is defined by [Equation 2] described below:

$$\alpha = \tan^{-1}\sqrt{\frac{1}{CPR}} \qquad \text{[Equation 2]}$$

where $\alpha$ represents the first rotation angle and CPR represents the co-polar ratio.

16. The apparatus of claim 15, wherein the second rotation angle is defined by [Equation 3] described below:

$$\beta = \frac{\pi}{2} - \tan^{-1}\sqrt{\frac{1}{CPR}} \quad \text{[Equation 3]}$$

where $\beta$ represents the second rotation angle and CPR represents the co-polar ratio.

\* \* \* \* \*